United States Patent
Schiff

(10) Patent No.: US 9,647,542 B2
(45) Date of Patent: May 9, 2017

(54) SWITCHED MODE POWER SUPPLIES

(71) Applicant: TOUMAZ MICROSYSTEMS LIMITED, Oxfordshire (GB)

(72) Inventor: Albrecht Johannes Schiff, Winchester (GB)

(73) Assignee: TOUMAZ MICROSYSTEMS LIMITED, Oxfordshire (GB)

( * ) Notice: Subject to any disclaimer, the term of this patent is extended or adjusted under 35 U.S.C. 154(b) by 0 days.

(21) Appl. No.: 14/595,545

(22) Filed: Jan. 13, 2015

(65) Prior Publication Data
US 2015/0200591 A1  Jul. 16, 2015

(30) Foreign Application Priority Data

Jan. 14, 2014  (GB) .................................. 1400561.5

(51) Int. Cl.
G05F 1/00 (2006.01)
H02M 3/156 (2006.01)
H02M 1/15 (2006.01)

(52) U.S. Cl.
CPC ............. H02M 3/156 (2013.01); H02M 1/15 (2013.01); *H02M 2003/1566* (2013.01)

(58) Field of Classification Search
CPC .... H02M 3/156; H02M 3/155; H02M 3/1552; H02M 3/1563; H02M 3/15566;

(Continued)

(56) References Cited

U.S. PATENT DOCUMENTS

2007/0091651 A1* 4/2007 Jang ........................... 363/21.01
2007/0103122 A1* 5/2007 Morong .................... G05F 1/46
323/205

(Continued)

FOREIGN PATENT DOCUMENTS

JP  2012-125069  6/2012

OTHER PUBLICATIONS

Kaczmarek et al., "Comparison of Classic DC/DC Converters with Converters Equipped with Analog-Digital Regulator Based on Law of Conservation of Energy (Bumblebee Type)," Mixed Design of Integrated Circuits and Systems, 2007, Mixdes '07, 14th Intl. Conf. on, IEEE, PI, pp. 564-569 (Jun. 1, 2007) XP031124442.

(Continued)

*Primary Examiner* — Timothy J Dole
*Assistant Examiner* — Carlos Rivera-Perez
(74) *Attorney, Agent, or Firm* — Saul Ewing LLP

(57) ABSTRACT

A switched mode power supply, SMPS. The SMPS comprises a switch, one or more inductors, an output smoothing capacitor, and a controller. The controller is configured to determine a first energy difference that is an instantaneous energy in the inductor(s) minus an energy in the inductor(s) at a load current, and determine a second energy difference that is an energy in the output smoothing capacitor at a reference voltage minus an instantaneous energy in the output smoothing capacitor. The controller is further configured to turn the switch on and off with a clock rate and a variable duty cycle such that the switch is on from the start of each period of the clock until the first energy difference is substantially equal to the second energy difference, and such that the switch is otherwise off.

10 Claims, 3 Drawing Sheets

(58) Field of Classification Search
CPC ........ H02M 3/157; H02M 3/158; H02M 1/14;
H02M 1/15; H02M 2001/0009; H02M
2001/0025; H02M 3/145; H02M 3/1555;
H02M 3/1582; H02M 3/1588; H02M
3/33507; H02M 3/33515; H02M
2003/1566
USPC ........ 323/222–226, 271–277, 282–288, 351,
323/280, 205–211; 363/21.01, 21.09,
363/21.1, 21.11, 21.17, 21.18, 23, 25, 26,
363/80, 89, 97, 123–127, 74–79;
713/300–340
See application file for complete search history.

(56) References Cited

U.S. PATENT DOCUMENTS

| | | |
|---|---|---|
| 2011/0199065 A1 | 8/2011 | Kume |
| 2012/0155121 A1 | 6/2012 | Yao |
| 2013/0147449 A1* | 6/2013 | Lawson .................. H02M 1/10 323/282 |

OTHER PUBLICATIONS

Gupta et al., "Super-Stable Energy Based Switching Control Scheme for Dc-DC Buck Converter Circuits," Conference Proceedings/IEEE Intl. Symp. on Circuits and Systems (ISCAS), Intl. Conf. Center, Kobe, Japan, IEEE SErvice Center, Piscataway, NJ, pp. 3063-3066 (May 23, 2005) XP010816239.

Kaczmarek et al., "Compensation of Calculations Duration on Converters Output Voltage in Digitally Controlled Converters Based on Law of Conservation of Energy—Project Bumblebee," Mixed Design of Integrated Circuits and Systems, 2007, Mixdes '07, 14th Intl. Conf. on, IEEE, PI, pp. 412-417 (Jun. 1, 2007) XP031124414.

European Search Report, dated May 13, 2015, issued in corresponding EP Application No. EP 15 15 0327.

Extended European Search Report, dated May 26, 2015, issued in corresponding EP Application No. EP 15150327.3.

Combined Search and Examination Report, dated Jun. 9, 2014, issued in priority UK Application No. GB1400561.5.

* cited by examiner

Voltage Control

Current Control

SWITCHED MODE POWER SUPPLIES

CROSS-REFERENCE TO RELATED APPLICATIONS

This application is based on and claims priority to UK Application No. GB1400561.5, filed Jan. 14, 2014, the entire contents of which is fully incorporated herein by reference.

FIELD OF THE INVENTION

The invention relates to a switched-mode power supplies.

BACKGROUND OF THE INVENTION

Switched-mode power supplies (SMPS, also called switch- or switching-mode) are power supplies which transfer power from a source (e.g. mains power or a battery) to a load (e.g. a personal computer or a microchip) while converting voltage and current characteristics. SMPSs function by rapidly switching a section of a circuit comprising an energy storage (consisting of at least one inductor), a power source, a load, and a smoothing capacitor connected in parallel with the load. As the current through an inductor cannot change instantaneously, different configurations of the power source and energy storage can result in step-up behaviour (load voltage higher than source voltage) or step-down behaviour (load voltage lower than source voltage). The step-up or step-down ratio is determined by the characteristics of the energy storage, and the duty cycle of the switch.

For the examples considered below, the following relationships are useful. These assume that all inductors and capacitors are ideal, but the skilled person will appreciate how the calculations should be modified for non-ideal components. In the following equations, symbols subscripted with L refer to an inductor, symbols subscripted with C refer to a capacitor, E is the energy of the component, and all other symbols have their conventional meaning in electronics.

$$V_L = L \frac{dI_L}{dt}$$

$$E_L = \frac{L}{2}(I_L^2)$$

$$E_c = \frac{C}{2}(V_c^2)$$

An example SMPS is the "buck converter" shown in FIG. 1. The inductor L acts as the energy storage component and the capacitor C acts as a smoothing capacitor. Disregarding the smoothing capacitor, when the switch is closed there is a positive voltage across the inductor, and the current through the inductor increases. As a result, the voltage across the load is less than the source voltage by the inductor voltage. When the switch is opened current through the inductor begins to decrease, and there is a voltage across the inductor with the opposite polarity to the inductor voltage while the switch is open. Since the load and the terminals of the inductor are connected only by a diode, the voltage across the load is equal to the voltage across the inductor. Taking into account now the smoothing capacitor, this acts to prevent the voltage from changing too quickly, and ensures a closer approximation to steady DC voltage at the output. The diode in FIG. 1 may be replaced by a switch which always in the opposite state to the switch shown (i.e. when each switch is open, the other is closed).

The buck convertor is a step-down converter with step down ratio (during stable operation, i.e. assuming constant output load and assuming the inductor current does not drop to zero)

$$\frac{V_o}{V_i} = D,$$

where $V_o$ is the output voltage, $V_i$ is the input voltage, and D is the duty cycle of the switch.

Other SMPS topologies are known in the art, and the following description may be applied to them by the skilled person. The buck converter will be used in examples for the remainder of this disclosure, but the principles herein may be applied to other SMPS topologies unless indicated otherwise.

The current through the energy storage is not constant at any point, and therefore the output voltage is not constant, but will have some "ripple", i.e. rising when the rising when the inductor current is higher than the load current and falling when it is lower than the load current. In the buck convertor, the amplitude of this ripple depends on the values of the inductor and the smoothing capacitor. In a generalised convertor, the amplitude depends at least on the inductance of the energy storage and the capacitance of the smoothing capacitor, but may depend upon other components/values. The bigger either or both of the inductance and capacitance are, the lower the amplitude of the ripple and the smoother the output.

Increasing the inductance and/or capacitance will however decrease the rate at which the circuit can respond to changes in the load. For a buck converter, if the load current drops suddenly, the output voltage will rise sharply and vice versa, as shown in FIG. 2. This spike in output voltage will decay back to the target output voltage over time. The decay tie may be shortened by modifying the duty cycle of the SMPS in dependence upon the output voltage or current.

A voltage control circuit is shown in FIG. 2. The output voltage is compared to a reference voltage (Vref), and the error amplified. This error is then compared to a ramp signal, such that when the error is greater than the ramp signal the output is a logical "high", and when the error is less than the ramp signal the output is logical "low". The output from the comparator creates the pulse width modulation which controls the switching of the SMPS. The ramp signal and reference voltage are configured such that the output voltage of the SMPS tends towards the target output voltage.

A current control circuit is shown in FIG. 3. The circuit is similar to that of the voltage control circuit, except that a voltage Vindcurrent is added at the comparator stage. Vindcurrent is dependent on the inductor current, which allows for faster response of the feedback circuit. The inductor current may be measured by directly integrating the voltage across the inductor, though this is likely to drift. Alternatively, the voltage across the switch S1 may be measured (since the current through S1 is equal to the current through the inductor while the switch is closed). The current/voltage relationship of S1 varies significantly with process, voltage, and temperature, and so, to ensure a more accurate measurement, a matched smaller transistor may be used, controlled such that it has the same drain voltage as S1, resulting in a current that is proportional to the switch current in S1.

The matched transistor may be controlled more tightly for other variables. A downside of current control is that the current measurement introduces a considerable amount of noise into the control, and hence into the output voltage.

For either control method, if the rate of change of the duty cycle is too high, then there will be stability problems, and the larger the inductance and/or the capacitance are for the SMPS, the slower the rate of change of the duty cycle must be. However, if the rate of change of the duty cycle is lower, then the voltage will overshoot or undershoot the desired voltage by a larger amount.

FIG. 4 shows the output voltage (upper graph) and load (lower graph) of a voltage controlled SMPS, and FIG. 5 shows the output voltage (upper graph) and load (lower graph) of a current controlled SMPS. Other than the feedback circuit, the SMPSs are identical. It is clear that the current controlled SMPS can cope better with changes in output load than the voltage controlled SMPS. It is also clear however that there is still scope for improvement.

SUMMARY OF THE INVENTION

According to a first aspect of the present invention, there is provided a switched mode power supply, SMPS. The SMPS comprises a switch, one or more inductors, an output smoothing capacitor, and a controller. The controller is configured to determine a first energy difference that is an instantaneous energy in the inductor(s) minus an energy in the inductor(s) at a load current, and determine a second energy difference (EC) that is an energy in the output smoothing capacitor at a reference voltage minus an instantaneous energy in the output smoothing capacitor. The controller is further configured to turn the switch on and off with a clock rate and a variable duty cycle such that the switch is on from the start of each period of the clock until the first energy difference is substantially equal to the second energy difference, and such that the switch is otherwise off.

According to a second aspect of the present invention, there is provided a method of operating a switched mode power supply, SMPS. The SMPS comprises one or more inductors, and output smoothing capacitor, and a switch. The method comprises determining a first energy difference, the first energy difference being an instantaneous energy in the inductor(s) minus an energy in the inductor(s) at a load current, and determining a second energy difference, the second energy difference being an energy in the output smoothing capacitor at a reference voltage minus an instantaneous energy in the output smoothing capacitor. The method further comprises turning the switch on and off with a clock rate and a variable duty cycle such that the switch is on from the start of each clock cycle until the first energy difference is substantially equal to the second energy difference, and such that the switch is otherwise off.

DETAILED DESCRIPTION OF THE INVENTION

Figure 1:
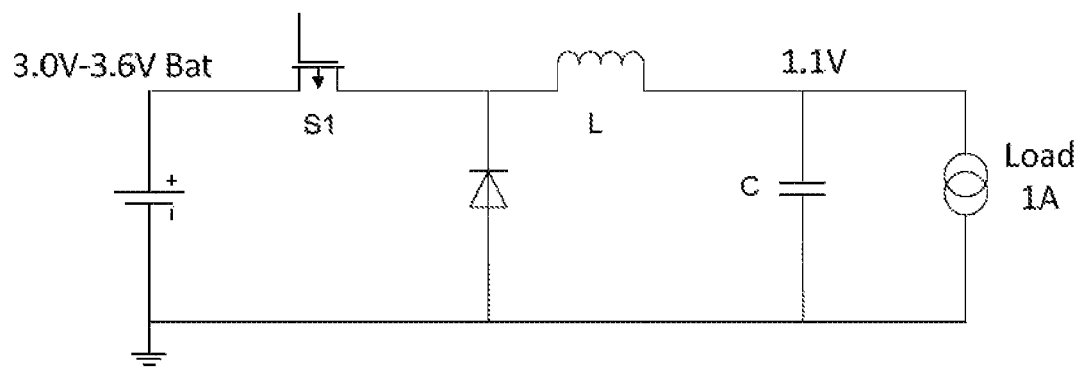
FIG. 1 is a circuit diagram of a switched mode power supply (SMPS)
Figure 2:
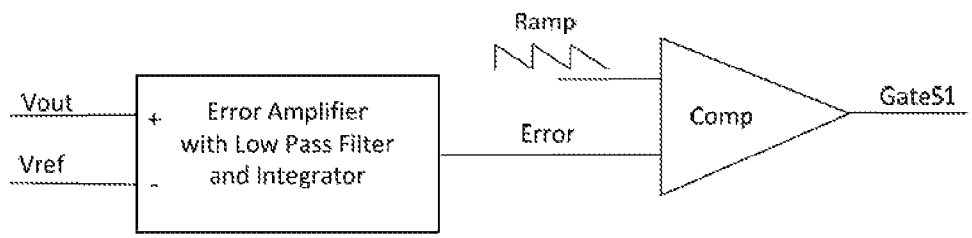
FIG. 2 is a schematic of a voltage control circuit for an SMPS.
Figure 3:
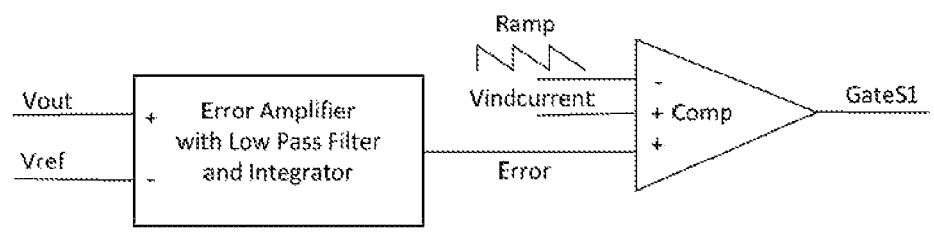
FIG. 3 is a schematic of a current control circuit for an SMPS.
Figure 4:
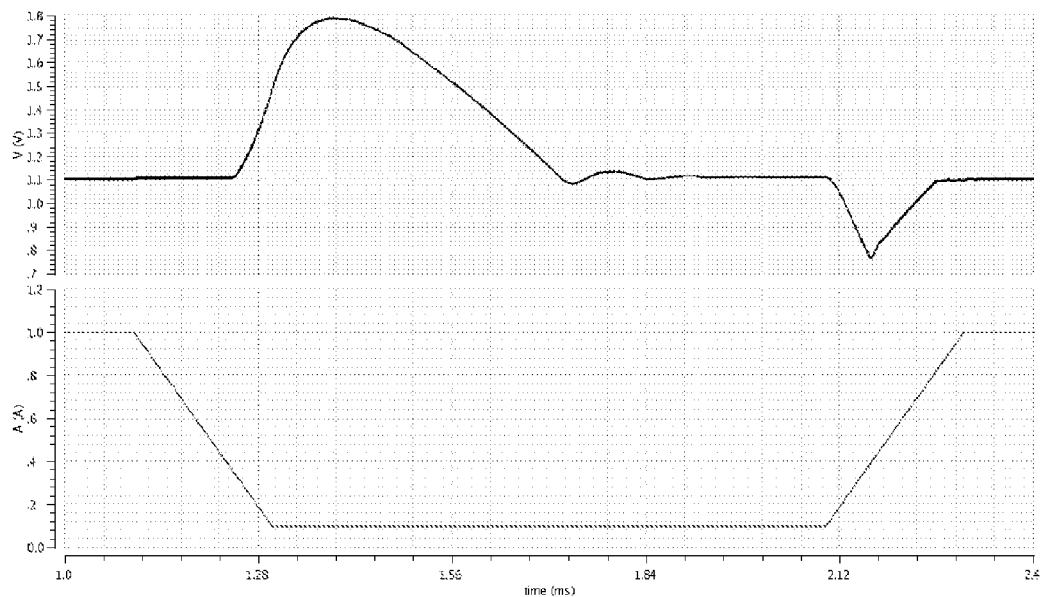
FIG. 4 is a graph showing the response of a voltage controlled SMPS to changing load current.
Figure 5:
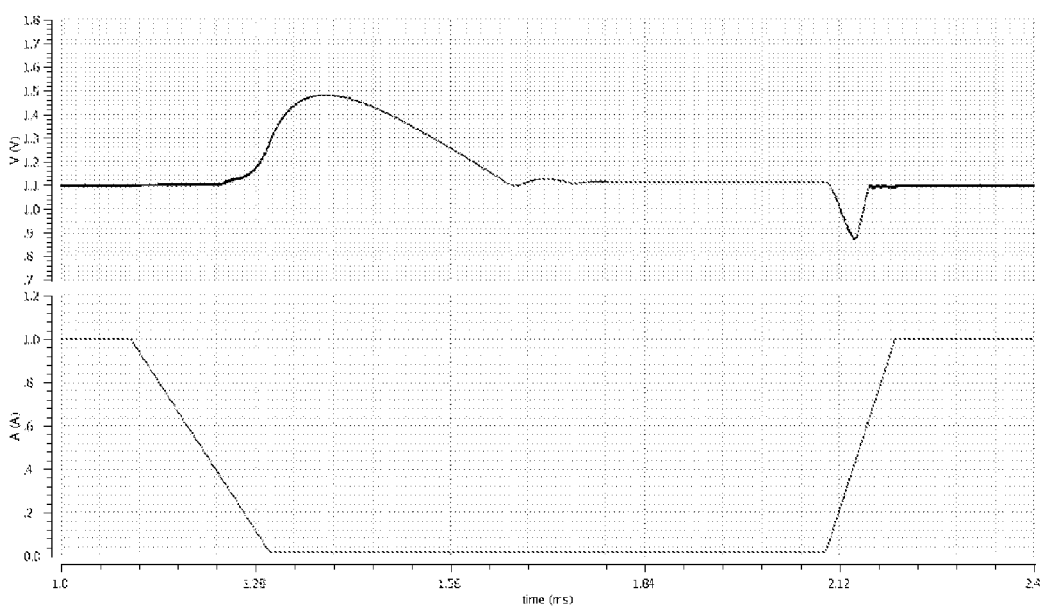
FIG. 5 is a graph showing the response of a current controlled SMPS to changing load current.

The bandwidth of the control loop for the feedback circuits described in the above background is limited by the LC time constant of the SMPS (or equivalent constants for other topologies). The time constant should be large to minimise ripple and noise, but should be low to minimise the response time to changes in the load.

The solution proposed herein is based on the principle that when S1 is closed, energy is being added to the inductor, so S1 should be switched off when the excess energy in the inductor (i.e. the difference between the instantaneous energy of the inductor and the energy of the inductor when the current through the inductor equals the load current) is equal to the required energy in the output capacitor (i.e. the difference between the energy in the capacitor when the voltage across the capacitor is the reference voltage ($V_{target}$), and the instantaneous energy in the capacitor). More generally, for all topologies, the excess energy is the excess energy in any inductors which charge the output smoothing capacitor when the switch configuration is such that energy is added to the inductor. Switched mode power supplies that do not include inductors (e.g. charge pumps) are not the subject of this disclosure.

The reference voltage $V_{target}$ may be the desired output voltage of the SMPS, or it may be determined dynamically as described in more detail below.

Expressed mathematically (for the buck converter, other topologies may have additional inductor terms on the left hand side):

$$\frac{L}{2}(I_L^2 - I_{load}^2) = \frac{C}{2}(V_{target}^2 - V_C^2)$$

The terms may be simplified as follows (shown for the capacitor term by way of example):

$$E = \frac{C}{2}(V_{target}^2 - V_C^2)$$

$$\frac{2E}{CV_{target}^2} = \left(1 - \left(\frac{V_C}{V_{target}}\right)^2\right)$$

$$\left(\frac{V_C}{V_{target}}\right)^2 = \left[1 + \left(\frac{V_C}{V_{target}} - 1\right)\right]^2 \approx 1 + 2\left(\frac{V_C}{V_{target}} - 1\right) + O\left[\left(\frac{V_C}{V_{target}} - 1\right)^2\right]$$

As $V_C/V_{target}$ is approximately 1, the higher powers of ($V_C/V_{target}-1$) are approximately 0 and can be disregarded. Therefore:

$$\frac{2E}{CV_{target}^2} = 1 - \left[1 + 2\left(\frac{V_C}{V_{target}} - 1\right)\right]$$

$$\frac{2E}{CV_{target}^2} = -2\left(\frac{V_C}{V_{target}} - 1\right)$$

$$E = CV_{target}(V_{target} - V_C)$$

-continued

Similarly $$E = LI_L(I_L - I_{load})$$

$$\therefore \frac{L}{C}I_L(I_L - I_{load}) = V_{target}(V_{target} - V_C)$$

The inductance term requires a proper multiplication, since neither $I_L$ nor $I_{load}$ is constant, and this may be achieved by a Gilbert cell with proper biasing, or by any other method known to the person skilled in the art. $I_{load}$ may be approximated by the inductor current at the point where S1 changes from open to closed. The capacitance term may be easily implemented in circuitry. Provided $V_{target}$ is constant, the term is proportional to $V_C$. Where $V_{target}$ changes over time, a multiplication must be performed. The comparison may be simply implemented by any suitable circuit, or by digital logic (e.g. converting the voltage and current into binary values and performing the calculations directly). In the case of a general SMPS, there may be multiple inductor terms on the left hand side of the equation, but each may be treated individually and combined by suitable circuitry. Depending on the relationship between the currents through each inductor, then simpler expressions may be derived for the total excess energy.

One advantage of the control proposed herein is that there is no longer a bandwidth limitation on the feedback due to the time constant of the SMPS. The duty cycle changes on the next clock cycle after a change in load or input voltage. This enables much larger L and C values to be used without severely degrading the response time of the SMPS, resulting in a much lower ripple voltage.

The circuit may be further improved by adjusting the reference voltage $V_{target}$ by a simple op-amp comparison to the output voltage (taken on a second, slow feedback loop, so that it responds to a rolling average output voltage). This increases the gain in the feedback, and reduces the effect of variations in the characteristics of the feedback circuitry due to process, voltage, and temperature (PVT) effects.

As the control depends on instantaneous current measurement, it will cause some added noise, but since the feedback loop ensures that any deviations are quickly counteracted, this will have minimal effect.

Figure 6:
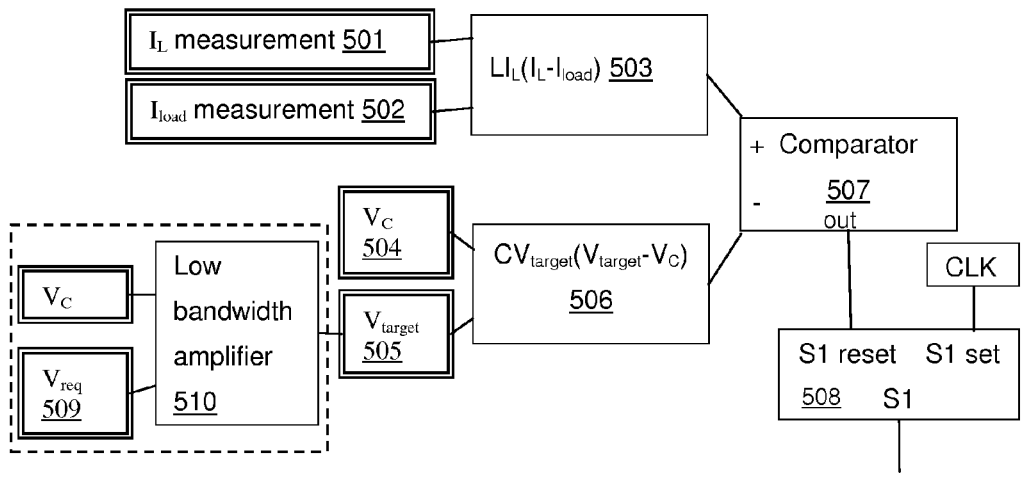
FIG. 6 is a schematic of a control circuit for an SMPS.

FIG. 6 is a schematic of a control circuit according to the present disclosure. Boxes with double lines represent quantities measured from the SMPS. The dashed box represents the optional further control of $V_{target}$. The voltages corresponding to the current measurements $I_L$ 501 and $I_{load}$ 502 are combined by circuitry 503 to generate a voltage corresponding to the excess energy in the inductor. This combination occurs according to the formula for the excess energy, $(L/2)(I_L^2 - I_{load}^2)$, or a suitable approximation such as $LI_L(I_L - I_{load})$. The multiplication may be implemented in the form of Gilbert cells or other suitable circuitry. The voltage across the capacitor 504 and the target voltage 505 are combined by circuitry 506 to generate a voltage corresponding to the required energy in the capacitor. The excess energy in the inductor and the required energy in the capacitor are compared by a comparator 507, which is configured such that the output is high when the excess energy in the inductor is greater than the required energy in the capacitor, and low otherwise. The output to the comparator 507 is connected to a latch 508, which controls the switch S1. The latch is configured to open the switch S1 when the output to the comparator goes high.

$V_{target}$ may be a static value (e.g. the required output voltage of the SMPS, $V_{req}$), or it may be determined dynamically by passing the voltage across the capacitor $V_C$ and required output voltage $V_{req}$ 509 to a low bandwidth amplifier 510, which will produce a signal dependent on the difference between the voltage across the capacitor (which is equivalent to the output voltage) and the required output voltage. A low bandwidth amplifier is used to smooth out ripple in the capacitor voltage, so that only the average value over several clock cycles is used. The amplifier is configured such that when $V_C = V_{req}$, the output of the amplifier is $V_{req}$.

Figure 7:
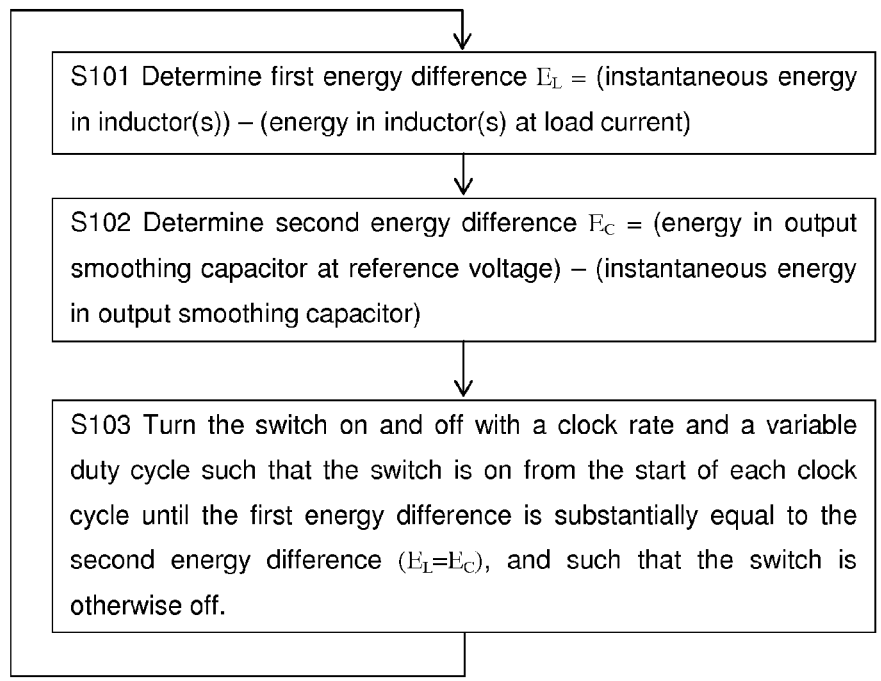
FIG. 7 is a flowchart of a method of operating an SMPS.

FIG. 7 is a flowchart of a method of operating an SMPS. In step S101, a first energy difference is determined, the first energy difference being the instantaneous energy in the inductor(s) of the SMPS minus the energy in the inductor(s) of the SMPS when the current through the inductor(s) is equal to the load current. In step S102, a second energy difference is determined, the second energy difference being the energy in the output smoothing capacitor of the SMPS at a reference voltage minus the instantaneous energy in the output smoothing capacitor. In step S103, the switch of the SMPS is turned on and off with a a clock rate and a variable duty cycle such that the switch is on from the start of each clock cycle until the first energy difference is substantially equal to the second energy difference ($E_L = E_C$), and such that the switch is otherwise off.

The SMPS control described above is particularly useful for any SMPS application involving a changing load. For example, it would be particularly suited for computer chips which require greater current supply when performing calculations than when idle, or to devices with multiple modes (e.g. an active mode, a sleep mode, etc.) which are required to switch between the modes quickly. This simplifies the design of such loads, since they no longer need to be configured to vary the load current slowly in order to mitigate the disadvantages of a conventional SMPS.

The SMPS control described above is also particularly suited to loads requiring very low ripple voltage, as it allows an SMPS with very high inductance and capacitance to be used while maintaining an acceptable response to changing loads. Conventionally, such loads would require a linear regulator, which is inefficient. Examples of such circuits include audio circuits, radio receivers or transmitters, and general analog circuitry.

Although the invention has been described in terms of preferred embodiments as set forth above, it should be understood that these embodiments are illustrative only and that the claims are not limited to those embodiments. Those skilled in the art will be able to make modifications and alternatives in view of the disclosure which are contemplated as falling within the scope of the appended claims. In particular, the disclosure may be adapted be the skilled person to apply to switched mode power supplies other than the buck converter used as an example in the present disclosure.

The invention claimed is:

1. A switched mode power supply, SMPS, comprising:
   a switch;
   one or more inductors;
   an output smoothing capacitor; and
   a controller comprising:
   a first current measuring unit configured to measure a current through the or each inductor;
   a second current measuring unit configured to measure a load current;
   a voltage measuring unit configured to measure a voltage across the output smoothing capacitor;

first energy calculation circuitry configured to determine a first energy difference (EL) that is an instantaneous energy in the inductor(s) minus an energy in the inductor(s) at a load current, wherein the first energy difference is determined by summing, over each of the one or more inductors, an inductance (L) of the inductor multiplied by an instantaneous current (IL) through the inductor multiplied by a difference between the instantaneous current through the inductor and the load current (Iload) (EL∝Σ[LIL (IL+Iload)]), second energy calculation circuitry configured to determine a second energy difference (Ec) that is an energy in the output smoothing capacitor at a reference voltage minus an instantaneous energy in the output smoothing capacitor, wherein the second energy difference is determined by multiplying the reference voltage (Vtarget) by a difference between the reference voltage and the instantaneous voltage (Vc) across the output smoothing capacitor (Ec∝Vtarget (Vtarget-Vc)), and a comparator configured to turn the switch on and off with a clock rate and a variable duty cycle such that the switch is on from the start of each period of the clock until the first energy difference is equal to the second energy difference (EL=Ec), and such that the switch is otherwise off.

2. The SMPS according to claim 1, wherein the reference voltage is equal to a required output voltage of the SMPS.

3. The SMPS according to claim 1, wherein the reference voltage is dependent upon a required output voltage of the SMPS and an instantaneous output voltage of the SMPS.

4. The SMPS according to claim 1, wherein the first and/or second energy calculation circuitry comprises at least one Gilbert cell configured to perform the respective multiplications.

5. The SMPS according to claim 1, wherein the first and/or second energy calculation circuitry comprises at least one Gilbert cell configured to perform the respective multiplications.

6. A method of operating a switched mode power supply, SMPS, the SMPS comprising one or more inductors, and output smoothing capacitor, and a switch, the method comprising:

determining a first energy difference (EL), the first energy difference being an instantaneous energy in the inductor(s) minus an energy in the inductor(s) at a load current, wherein the first energy difference is determined by summing, over each of the one or more inductors, an inductance (L) of the inductor multiplied by an instantaneous current (IL) through the inductor multiplied by a difference between the instantaneous current through the inductor and the load current (Iload) (EL ∝Σ[LIL (IL+Iload)]);

determining a second energy difference (Ec), the second energy difference being an energy in the output smoothing capacitor at a reference voltage minus an instantaneous energy in the output smoothing capacitor, wherein the second energy difference is determined by multiplying the reference voltage (Vtarget) by a difference between the reference voltage and the instantaneous voltage (Vc) across the output smoothing capacitor (Ec∝Vtarget (Vtarget-Vc));

turning the switch on and off, using a comparator, with a clock rate and a variable duty cycle such that the switch is on from the start of each clock cycle until the first energy difference is equal to the second energy difference (EL=Ec), and such that the switch is otherwise off.

7. The method according to claim 6, wherein the reference voltage is equal to a required output voltage of the SMPS.

8. The method according to claim 6, wherein the reference voltage is dependent upon a required output voltage of the SMPS and an instantaneous output voltage of the SMPS.

9. The method according to claim 6, wherein at least one of the multiplications is performed using a Gilbert cell.

10. The method according to claim 6, wherein at least one of the multiplications is performed using a Gilbert cell.

* * * * *